(12) United States Patent
Tretter

(10) Patent No.: US 6,882,491 B2
(45) Date of Patent: Apr. 19, 2005

(54) DUAL MODE WRITE DRIVER PROVIDING BOTH VOLTAGE AND CURRENT MODE OPERATION

(75) Inventor: Larry L. Tretter, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 10/283,752

(22) Filed: Oct. 30, 2002

(65) Prior Publication Data

US 2004/0085665 A1 May 6, 2004

(51) Int. Cl.[7] ............................................... G11B 5/02
(52) U.S. Cl. ....................................................... 360/68
(58) Field of Search ............................. 360/68, 67, 46; 327/108, 110

(56) References Cited

U.S. PATENT DOCUMENTS

| | | | |
|---|---|---|---|
| 6,236,246 B1 | 5/2001 | Leighton et al. | |
| 6,252,450 B1 | 6/2001 | Patti et al. | |
| 6,271,977 B1 | * 8/2001 | Chung et al. | 360/46 |
| 6,307,699 B1 | 10/2001 | Patti et al. | |
| 6,324,028 B1 | * 11/2001 | Ramalho et al. | 360/68 |
| 6,735,030 B1 | * 5/2004 | Ngo et al. | 360/46 |

* cited by examiner

Primary Examiner—Alan T. Faber
(74) Attorney, Agent, or Firm—Scully, Scott Murphy & Presser; Jean M. Barkley

(57) ABSTRACT

A dual mode write driver, such as in a tape or disk drive system, provides both a voltage mode of operation and a current mode of operation by combining the required topology in a write driver circuit. A logic control signal applied to an input to the dual mode write driver causes the circuit to configure for either mode. The write driver has a first PFET (P3) coupled to a first NFET (N1) at a first node connected through a resistor (R1) to a first side of a write head (L1) of the write driver, and a second PFET (P4) coupled to a second NFET (N2) at a second node connected through a resistor (R2) to a second side of the write head. A first voltage mode NFET device is turned on during the voltage mode to connect the sources of the first and second NFET devices to ground.

20 Claims, 3 Drawing Sheets

(VOLTAGE MODE)

(CURRENT MODE)

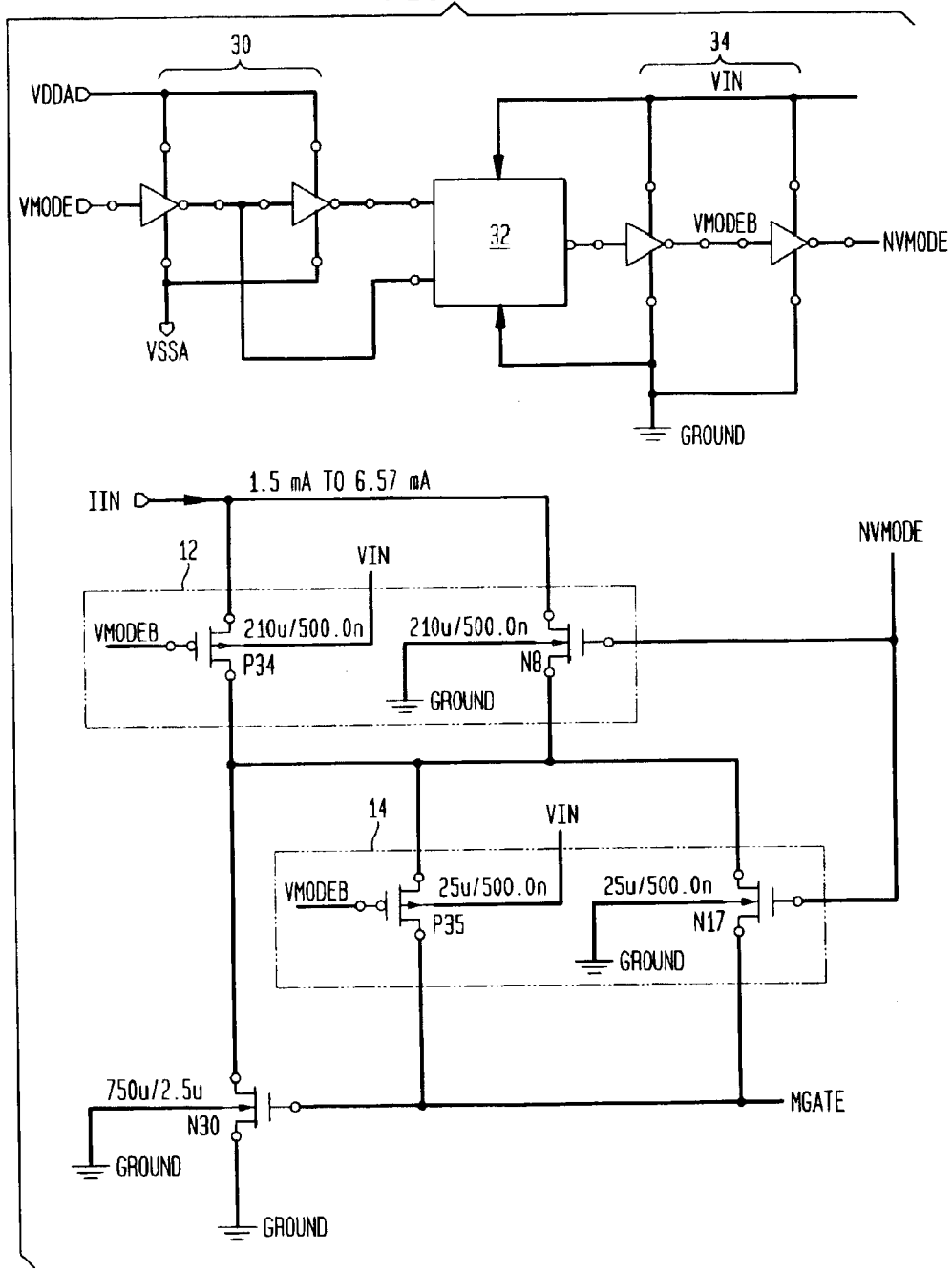

DUAL MODE WRITE DRIVER PROVIDING BOTH VOLTAGE AND CURRENT MODE OPERATION

BACKGROUND OF THE INVENTION

1. Field of the Invention

The present invention relates generally to a dual mode write driver providing both a voltage mode of operation and a current mode of operation, and more particularly pertains to a dual mode write driver which combines the required topology in a write driver circuit to allow either current mode operation or voltage mode operation. A logic control signal is applied to an input to the dual mode write driver to cause the circuit to configure for either voltage mode operation or current mode operation. The dual mode write driver is typically used in a tape or disk drive system to write data onto a tape or disk recording medium.

2. Discussion of the Prior Art

FIG. 1 shows a simple voltage mode write driver. For this write driver, the current through the write head is determined by the value of the resistors R1, R2, and the voltage source V1. This assumes that the NFET devices N1, N2 and the PFET devices P3, P4 have a low voltage drop from source to drain when they are turned on.

During a tape or disk write operation, one input IN is applied to the gates of N1 and P3, and a second complementary input NOT_IN is applied to the gates of N2 and P4. Each of the devices N1, N2, P3 and P4 is individually controlled to provide flexibility for operation of the write driver.

In FIG. 1, the devices P3 and P4 are PMOS FET (PFET) devices, while the devices N1 and N2 are NMOS FET (NFET) devices, with FIG. 1 illustrating the connections of each device to its source s, drain d, gate g and also to the substrate Sb.

The voltage mode write driver has a first PFET P3 coupled to a first NFET N1 at a first node which is connected through resistor R1 to a first side of a write head L1 of the write driver, and a second PFET P4 coupled to a second NFET N2 at a second node which is connected through resistor R2 to a second side of the write head L1.

For a normal write operation, the inputs to N1 and P3 are opposite to the inputs to N2 and P4. For example, if the inputs to N1 and P3 are at a zero voltage potential, while the inputs to N2 and P4 are at a potential V1, then the FET devices P3 and N2 are on and have a very low resistance, while the FET devices P4 and N1 are off and have a very high resistance. This causes the write current to flow in the direction from V1 through P3, L1, and N2. Conversely, if the inputs to N1 and P3 are at a voltage level of V1 while the inputs to N2 and P4 are at a zero voltage potential, then the devices N1/P4 are on and the devices N2/P3 are off. This causes the write current to flow in the direction from V1 through P4, L1, and N1.

If the devices P3 and P4 are at a V1 voltage potential, and the devices N1 and N2 are at a zero voltage potential, then all four FET devices are off.

FIG. 2 shows a simple current mode write driver. For this write driver, the current through the write head is determined by the value of the current source I1. Note that no resistors are in series with the write head L1. The circuit of FIG. 2 has many components coupled in a manner similar to, and which function in a manner similar to, the circuit of FIG. 1, such that those functions need not be repeated here.

SUMMARY OF THE INVENTION

Accordingly, it is a primary object of the present invention to provide a dual mode write driver providing both voltage and current modes of operation which combines the required topology in a write driver circuit to allow either current mode operation or voltage mode operation. A logic control signal is applied to an input to the dual mode write driver to cause the circuit to configure for either voltage mode operation or current mode operation.

BRIEF DESCRIPTION OF THE DRAWINGS

The foregoing objects and advantages of the present invention for a dual mode write driver providing both voltage and current modes of operation may be more readily understood by one skilled in the art with reference being had to the following detailed description of several embodiments thereof, taken in conjunction with the accompanying drawings wherein like elements are designated by identical reference numerals throughout the several views, and in which:

FIGS. 3A and 3B, when assembled with FIG. 3A to the left, and FIG. 3B to the right, present a schematic circuit of a preferred embodiment of a dual mode write driver circuit pursuant to the present invention which provides the ability to function in either a voltage mode of operation or a current mode of operation.

DETAILED DESCRIPTION OF THE INVENTION

Figure 3B:
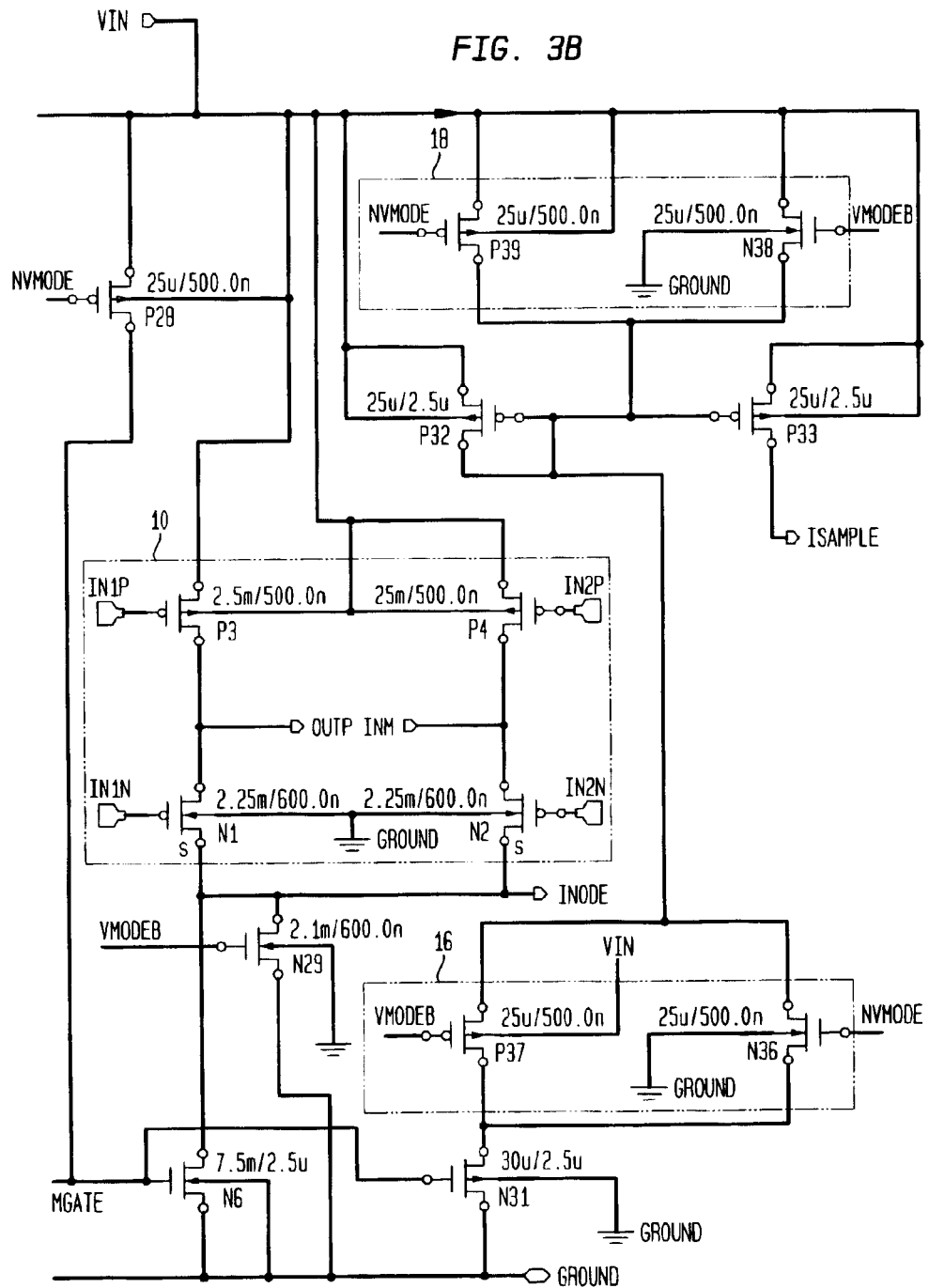

FIGS. 3A and 3B, when assembled with FIG. 3A to the left and FIG. 3B to the right, present a schematic circuit of a preferred embodiment of a dual mode write driver circuit pursuant to the present invention which provides the ability to function in either a voltage mode of operation or a current mode of operation. The dual mode write driver can typically be used in a tape or disk drive system for recording data on a tape or disk during a writing operation. During a write operation, a desired write current through a write head of the system is controlled and programmed, with the desired write current depending upon a number of different variables, such as the characteristics of the tape or disk media being recorded, with it being desirable to saturate the recording media during a write operation.

Figure 1:
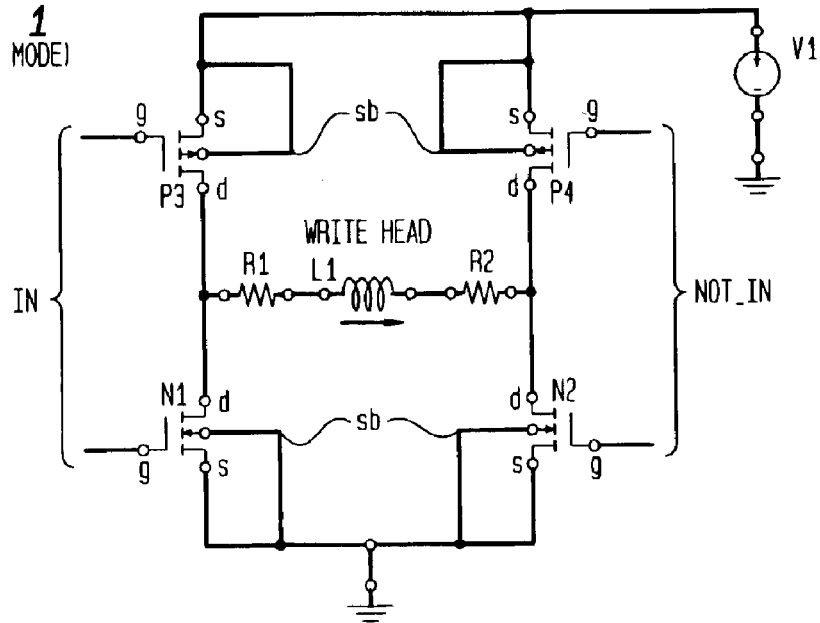
FIG. 1 shows a simple voltage mode write driver wherein the current through the write head is determined by the value of the resistors R1, R2, and the voltage source V1.
Figure 2:
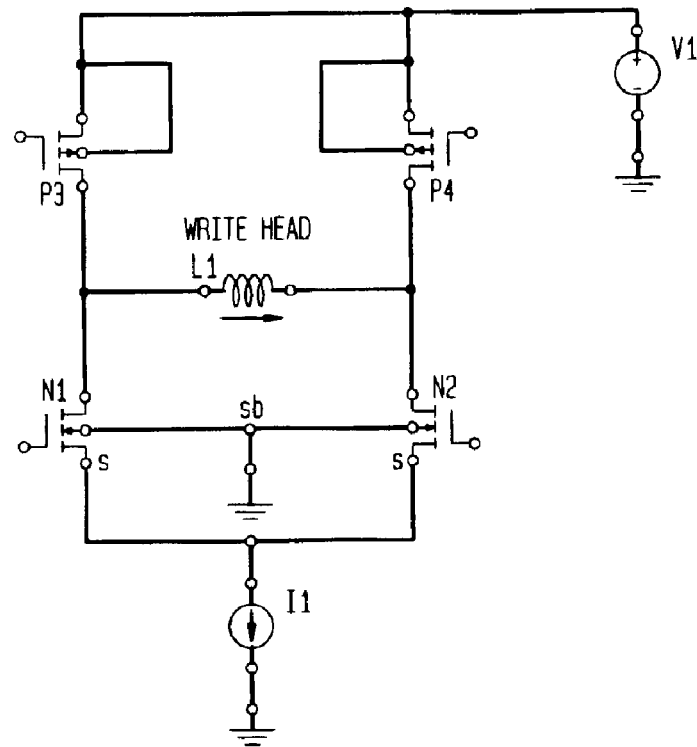
FIG. 2 shows a simple current mode write driver wherein the current through the write head is determined by the value of the current source I1.

In the circuit of FIG. 3B, the devices N1, N2, P3 and P4 of FIGS. 1 and 2 are enclosed in a dashed block 10, and the circuit outputs across I/O pins OUTP and INM are connected to the resistors R1 and R2 of the voltage mode write driver of FIG. 1, or directly to the write head L1 of the current mode write driver of FIG. 2.

The exemplary embodiment of FIGS. 3A and 3B utilizes the following parameters, although other embodiments could be designed with other parameters. The value of VDDA is 3.3 volts. The value of VIN can range from 5.25 to 2.8 volts. The value GROUND is 0 volts. The value of VSSA is 0 volts. The output of the write driver is across the pins OUTP and INM. Additionally, each of the devices of FIGS. 3A and 3B indicate their designed width/length. For instance, device N1 shows 2.25 m (width)/600.0 n (length).

Voltage Mode Write Driver

A logic control signal VMODE is applied to an upper left input of FIG. 3A to the dual mode write driver to cause the circuit to configure for either a voltage mode operation or a current mode operation.

When the circuit is to function as a voltage mode write driver, the control signal VMODE is at a logic one (3.3 volts). This means that the node vmodeb (voltage mode buffered) is at the same potential as VIN, and the node nvmode (not voltage mode) is at a potential of 0 volts.

Operation in the voltage mode requires that that the lower source electrodes s of the devices N1 and N2 be connected to ground in a manner similar to the connections of FIG. 1. To accomplish this, referring to FIG. 3B, a first voltage mode NFET device N29 is turned on hard because the node vmodeb is at the potential of VIN. Also, a first PFET device P28 is turned on hard, because its gate is connected to node nvmode which is at a potential of zero volts, which pulls the node mgate up to the voltage value of VIN. This will turn on a large second voltage mode NFET device N6. The devices N29 and N6 in combination provide a very low resistance between their sources and drains, which essentially couples the sources of the devices N1 and N2 to ground, as in FIG. 1. For proper voltage mode operation, this low resistance is a requirement, and is provided primarily by the NFET device N29, which is added for voltage mode operation, and also by the NFET device N6, which is also required for current mode operation. The dual mode write driver is now configured for voltage mode operation.

When the circuit is to function as a voltage mode write driver, the control signal VMODE is at a logic one (3.3 volts). This means that the node vmodeb (voltage mode buffered) is at the same potential as VIN, and the node nvmode (not voltage mode) is at a potential of 0 volts. Given these conditions, the PFET devices P34, P35 and P37 and the NFET devices N8, N17 and N36 in respective dashed blocks 12, 14 and 16 are turned off, and the PFET device P39 and the NFET device N38 in dashed block 18 are turned on.

Devices P34/N8 in block 12 form a first transfer circuit, devices P35/N17 in block 14 form a second transfer circuit, devices P37/N36 in block 16 form a third transfer device, and the devices P39/N38 in block 18 form a fourth transfer circuit. The transfer circuits in blocks 12, 14 and 16 function as closed analog switches during operation in the current mode, and are not used and are open during operation in the voltage mode, and conversely the transfer circuit in block 18 functions as a closed analog switch during operation in the voltage mode, and is not used and is open during operation in the current mode.

Current Mode Write Driver

When operating in the current mode, the write current through the write head is proportional to the input reference current IIN at I/O pin IIN which can vary between 1.5 and 6.57 mA as shown in FIG. 3A. The actual write current is monitored and measured at an I/O pin ISAMPLE connected to the drain of PFET P33.

When the circuit is to function as a current mode write driver, the control signal VMODE is at a logic zero (0 volts). This means that the node vmodeb is at GROUND potential (0 volts), and the node nvmode is at the same potential as VIN.

Given these conditions, the first, second and third transfer circuits 12, 14 and 16 are turned on, and each transfer circuit functions as an analog switch wherein as the voltage across the transfer circuit changes, one of the two devices of the transfer circuit conducts a greater percentage of the current, while the second device conducts a lesser percentage of the current. The result of this type of operation is that the resistance across each transfer circuit remains relatively constant.

The PFET device P28 and the NFET device N29, required for voltage mode operation, are turned off during current mode operation.

With the transfer circuits in blocks 12, 14 and 16 being turned on and the device N29 being turned off, the following NFET devices are now connected and function as current mirrors, N30 connected to the first and second transfer circuits, N6 connected to the write head circuit 10, and N31 connected to the third transfer circuit. The reference current is applied at node IIN, and is mirrored at N30, N6 and N31. Note in FIGS. 3A and 3B that the widths of the devices N30, N6 and N31 (all with constant length of 2.5 u) are specified to be respectively 750 u, 7.5 m and 30 u, which controls the magnitude of the current produced and mirrored in each device. For a current of 1.5 ma flowing through device N30, device N6 will produce a current of 15 ma (10:1), and device N31 will produce a current of 60 ua (0.04:1).

The third transfer circuit 16 is also turned on, which allows current to flow from PFET P32, through PFET P37 and NFET N36 to NFET N31, which is also functioning as a current mirror as explained above, such that the magnitude of the current through P32 depends upon the magnitude of the current through N31. This arrangement allows P32/P33 to also function as current mirrors, such that the magnitude of the current flowing through device P33, which is monitored at the I/O pin ISAMPLE as explained above, depends upon the magnitude of the current flowing through the device P32, the magnitude of the current flowing through the device N31, the magnitude of the current flowing through the device N6, and the magnitude of the current flowing through the device N30, all of which depend upon the magnitude of the current at IIN.

With VMODE control signal at 0 volts, the write driver is now configured for a current mode operation, with the magnitude of the write current being specified by the input current at the I/O node IIN and being monitored at the I/O node ISAMPLE.

The other components of the circuit located generally in the upper portion of FIG. 3A generally include somewhat standard circuits, including inverters below bracket 30 for the inputs VDDA and VMODE, an inverting level shifter 32 to compensate for the different voltage levels of VDDA and VIN, and inverters below bracket 34.

While several embodiments and variations of the present invention for a dual mode write driver providing both voltage and current mode operation are described in detail herein, it should be apparent that the disclosure and teachings of the present invention will suggest many alternative designs to those skilled in the art.

I claim:

1. A dual voltage mode and current mode write driver which can function in either a voltage mode of operation or a current mode of operation comprising:

a first PFET device coupled to a first NFET device at a first node which is coupled to a first side of a write head driven by the write driver;

a second PFET device coupled to a second NFET device at a second node which is coupled to a second side of the write head driven by the write driver;

a first voltage mode NFET device which is turned on during the voltage mode to connect the sources of the first and second NFET devices to ground.

2. The dual mode write driver of claim 1, wherein during the voltage mode a second voltage mode NFET device is also turned on to connect the sources of the first and second NFET devices to ground, and a first voltage mode PFET device is also turned on to turn on the second voltage mode NFET device.

3. The dual mode write driver of claim 2, wherein during a current mode of operation, the first voltage mode NFET is turned off, and the second voltage mode NFET is turned on and functions as a current mirror of an input control current applied at an input node.

4. The dual mode write driver of claim 1, wherein during a voltage mode of operation, a plurality of transfer circuits, each including a PFET device and an NFET device, are turned off and a further transfer circuit is turned on, and during a current mode of operation, the plurality of transfer circuits are turned on and the further transfer circuit is turned off, and each turned on transfer circuit functions as an analog switch wherein as the voltage across the transfer circuit changes, one of the two devices of the transfer circuit conducts a greater percentage of the current and the second device conducts a lesser percentage of the current, such that a resistance across the transfer circuit remains relatively constant.

5. The dual mode driver of claim 4, wherein the plurality of transfer circuits includes first, second and third transfer circuits.

6. The dual mode write driver of claim 5, wherein during a current mode of operation, a plurality of current mirror devices are turned on and function as current mirrors of an input control current applied at an input node.

7. The dual mode write driver of claim 1, wherein during a current mode of operation, a plurality of current mirror devices are turned on and function as current mirrors of an input control current applied at an input node.

8. The dual mode write driver of claim 1, wherein during a current mode of operation, an actual write current of the dual mode write driver is proportional to an input reference current at an input node, and the actual write current is monitored and measured at a sample node.

9. The dual mode write driver of claim 8, wherein during a voltage mode of operation, a plurality of transfer circuits, each including a PFET device and an NFET device, are turned off and a further transfer circuit is turned on, and during a current mode of operation, the plurality of transfer circuits are turned on and the further transfer circuit is turned off, and each turned on transfer circuit functions as an analog switch wherein as the voltage across the transfer circuit changes, one of the two devices of the transfer circuit conducts a greater percentage of the current and the second device conducts a lesser percentage of the current, such that a resistance across the transfer circuit remains relatively constant.

10. The dual mode write driver of claim 9, wherein during a current mode of operation, the plurality of transfer circuits are turned on, which allows current to flow through a PFET device of one transfer circuit, which functions as a current mirror with a PFET device connected to the sample node.

11. The dual mode write driver of claim 10, wherein the current flowing through the PFET device of the one transfer circuit flows through another transfer circuit to a current mirror NFET, such that the magnitude of the current flowing through the PFET device of the one transfer circuit device is monitored at the sample node and depends upon the magnitude of the input control current applied at the input node.

12. The dual mode write driver of claim 8, wherein the input reference current is mirrored at first, second and third NFET devices, with the widths of the first, second and third NFET devices controlling the magnitude of the current produced through and mirrored in each device.

13. The dual mode write driver of claim 4, wherein during a current mode of operation with the plurality of transfer circuits being turned on, an NFET device connected to first and second transfer circuits, an NFET device connected to a write head circuit, and an NFET device connected to a third transfer circuit are turned on and function as current mirrors.

14. The dual mode write driver of claim 1, wherein during a current mode of operation, a plurality of current mirror NFET devices are turned on to function as current mirrors wherein an input reference current applied at an input node is mirrored at the plurality of current mirror NFET devices, and the actual write current of the dual mode write driver is monitored at a sample node.

15. A tape or disk drive system wherein a dual mode write driver is a component of the tape or disk drive system for recording data on a tape or disk during a write operation, and can function in either a voltage mode of the operation or a current mode of operation and comprises:
   a first PFET device coupled to a first NFET device at a first node which is coupled to a first side of a write head driven by the write driver;
   a second PFET device coupled to a second NFET device at a second node which is coupled to a second side of the write head driven by the write driver;
   a first voltage mode NFET device which is turned in during the voltage mode to connect the sources of the first and second NFET devices to ground.

16. The tape or drive system of claim 15, wherein during the voltage mode a second voltage mode NFET device is also turned on to connect the sources of the first and second NFET devices to ground, and a first voltage mode PFET device is also turned on to turn on the second voltage mode NFET device.

17. The tape or drive system of claim 16, wherein during a current mode of operation, the first voltage mode NFET is turned off, and the second voltage mode NFET is turned on and functions as a current mirror of an input control current applied at an input node.

18. A method of operating a dual voltage mode and current mode write driver in either a voltage mode of operation or a current mode of operation comprising:
   coupling a first PFET device to a first NFET device at a first node which is coupled to a first side of a write head driven by the write driver;
   coupling a second PFET device to a second NFET device at a second node which is coupled to a second side of the write head driven by the write driver;
   turning on a first voltage mode NFET device on during the voltage mode to connect the sources of the first and second NFET devices to ground.

19. The method of claim 18, wherein during the voltage mode, also turning on a second voltage mode NFET device to connect the sources of the first and second NFET devices to ground, and also turning on a first voltage mode PFET device to turn on the second voltage mode NFET device.

20. The method of claim 19, wherein during a current mode of operation, turning off the first voltage mode NFET, and turning on the second voltage mode NFET which functions as a current mirror of an input control current applied at an input node.

* * * * *